UNITED STATES PATENT OFFICE.

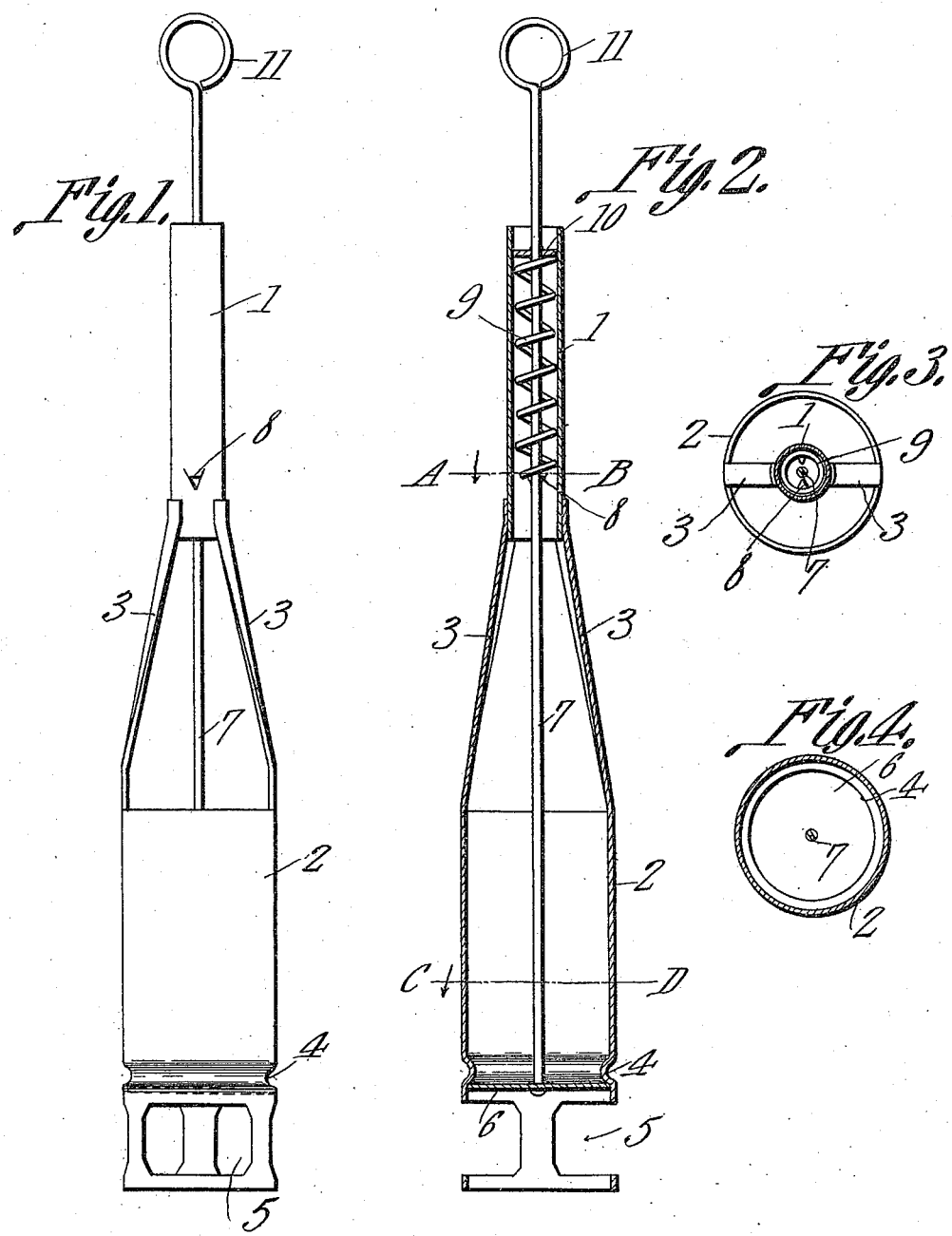

EDGAR J. MULLINEAUX, OF SNEFFELS, COLORADO, ASSIGNOR OF ONE-FOURTH TO WARD N. CHENEY AND ONE-FOURTH TO EDWIN H. PLATT, BOTH OF SNEFFELS, COLORADO.

CREAM-REMOVING DEVICE.

984,838.  Specification of Letters Patent.  Patented Feb. 21, 1911.

Application filed June 7, 1910. Serial No. 565,530.

*To all whom it may concern:*

Be it known that I, EDGAR J. MULLINEAUX, a citizen of the United States, residing at Sneffels, in the county of Ouray and State of Colorado, have invented a new and useful Cream-Removing Device, of which the following is a specification.

It is the object of this invention, to provide, in a simple and merchantable form, a device which may be employed for removing cream from milk bottles, and like containing vessels.

It is the object of the invention to provide a device of this sort which will readily permit the entrance of the cream into the device, the component parts thereof, however, being so constructed that the cream, when once within the device, will be retained therein, until manipulation by the operator, thus permitting the cream to flow out.

In the drawings;—Figure 1 is a side elevation; Fig. 2 is a longitudinal section, parts being shown in elevation; Fig. 3 is a transverse section on the line A—B of Fig. 2; and Fig. 4 is a transverse section on the line C—D of Fig. 2.

In carrying out the invention, a tubular body is provided, as a primary and fundamental element, this tubular body consisting of a casing 1, a cup 2, and transversely spaced arms 3, forming connections between the casing 1 and the cup 2, the arms 3 preferably, although not necessarily, being formed integrally with the cup 2. In the side wall of the cup 2, adjacent the lower end thereof, presupposing that the device is positioned as shown in Fig. 1 of the drawings, there are a plurality of openings 5. Above the openings 5 the cup 2 is bulged inwardly, to form a circumscribing shoulder 4, adapted to serve as a stop for a bottom 6 which reciprocates, across the openings 5, between the shoulder 4 and the lower end of the cup 2.

A plunger 7 is connected at its lower end with the bottom 6, the plunger being extended upwardly through the casing 1, and provided at its upper end with a ring 11, or the like, whereby the plunger may be manipulated.

Adjacent its lower end, teeth 8 are struck inwardly from the casing 1. These teeth 8 are adapted to receive the lower end of a compression spring 9, surrounding the plunger 7, and located within the casing 1. Secured to the plunger 7 is a guide 10. This guide 10 conforms approximately to the bore of the casing 1, and is adapted to serve as an abutment for the upper end of the compression spring 9.

Presupposing that the parts of the device are disposed as shown in Fig. 2, it will be seen that the finger of the operator may be engaged in the ring 11, thus depressing the plunger 7 and causing the bottom 6 to move downwardly, to extend across the opening 5. When the parts are thus disposed, the device may be inserted into a milk bottle or the like, the cream rising into the cup 2. When the cup 2 has been depressed to the desired extent into the cream, the ring 11 may be released, whereupon the spring 9, acting against the guide 10, will force the plunger 7 upwardly, causing the bottom to bear, throughout its entire periphery, against the shoulder 4 which circumscribes the cup 2. Thus the lower end of the cup will be closed, and the device may be removed from the receptacle. When it is desired to discharge the cream, by depressing the plunger 7, the bottom 6 may again be disposed across the opening 5, thus permitting the cream to flow out of the cup 2 into a receptacle of any sort.

By reason of the fact that the casing 1 and the cup 2 are connected by the transversely spaced arms 3, access for cleaning, and the like, may be readily had to the cup 2.

By referring to Fig. 2 of the drawings, it will be seen that the lower face of the shoulder 4 is inclined. By reason of this construction, the bottom, under the action of the spring 9 may be wedged tightly against the shoulder, thus effectively closing the lower end of the body, even though the bottom should not conform closely to the bore of the cup 2.

Having thus described the invention, what is claimed is:—

1. A device of the class described consisting of a tubular body having openings in its side wall adjacent its lower end, and a stop in its side wall above the opening; a slidable bottom coöperating with the said stop and adapted to move, between the stop and the lower end of the body, across the opening; a plunger rod connected with the bottom; and resilient means acting upon the rod to lift the same and hold the bottom in contact with the stop.

2. A device of the class described consisting of a tubular body having an opening in its side wall adjacent its lower end, and an inwardly projecting, circumscribing stop in its side wall above the opening; a slidable bottom coöperating with said stop and adapted to move between the stop and the lower end of the body, across the opening; a device connected with the bottom for sliding the same; and resilient means for normally holding the bottom in contact with the stop; the stop being inclined to receive the bottom.

3. A device of the class described including a body consisting of a casing, a cup, and transversely spaced arms connecting the casing and the cup; the cup having an opening adjacent its lower end, and a stop in its side wall above the opening; a bottom adapted to slide in the cup and to engage the stop; a plunger rod connected to the bottom; and resilient means located within the casing and engaging the rod to hold the bottom normally against the stop.

4. A device of the class described consisting of a tubular body having an opening in its side wall adjacent its lower end, and a stop in its side wall above the opening; a slidable bottom coöperating with said stop and adapted to move between the stop and the lower end of the body across the opening; a plunger rod connected with the bottom; a compression spring located in the body; there being teeth formed integrally with the body and struck therefrom, the teeth engaging the lower end of the spring; and a guide secured to the rod and conforming to the bore of the body, the guide constituting an abutment for the other end of the spring.

In testimony that I claim the foregoing as my own, I have hereto affixed my signature in the presence of two witnesses.

EDGAR J. MULLINEAUX.

Witnesses:
 EDWIN H. POTT,
 WARD N. CHENEY.